United States Patent [19]

Gifford et al.

[11] Patent Number: 4,893,643
[45] Date of Patent: Jan. 16, 1990

[54] TANK VAPOR VENT VALVE ASSEMBLY WITH IMPROVED OVERFILL PROTECTION

[75] Inventors: William E. Gifford, Hemlock; Carl H. Sherwood, Brockport; Charles H. Covert, Manchester; Kenenth W. Turner, Webster, all of N.Y.

[73] Assignee: General Motors Corporation, Detroit, Mich.

[21] Appl. No.: 316,001

[22] Filed: Feb. 27, 1989

[51] Int. Cl.⁴ .................................................. B01D 53/04
[52] U.S. Cl. ........................................ 137/202; 137/588; 220/85 VR
[58] Field of Search ................... 137/202, 588; 141/52, 141/290, 307; 220/85 VR, 85 VS

[56] References Cited

U.S. PATENT DOCUMENTS

| 3,786,829 | 1/1974 | Nardo | 137/202 |
| 4,640,304 | 2/1987 | Looney | 137/202 |
| 4,714,172 | 12/1987 | Morris | 220/86 |
| 4,747,508 | 5/1988 | Sherwood | 220/86 |
| 4,813,453 | 3/1989 | Jenkins | 137/588 |

Primary Examiner—Alan Cohan
Attorney, Agent, or Firm—Patrick M. Griffin

[57] ABSTRACT

A TVVA with a buoyant overfill protection float contains the float closely and axially slidably within a sleeve, and feeds a negative pressure created by the rapid flow of fill vapors over the outside of the sleeve into the sleeve to hold the float down and prevent it from corking.

3 Claims, 3 Drawing Sheets

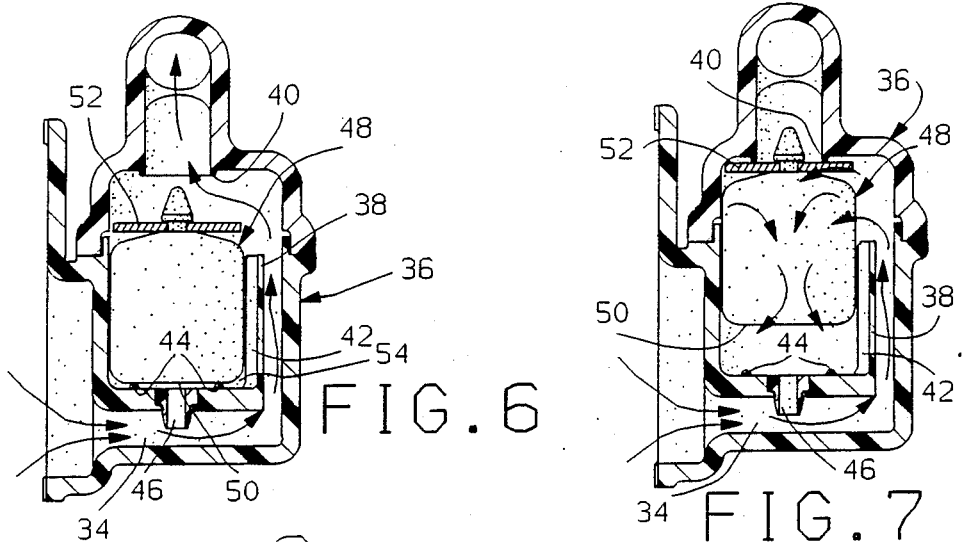
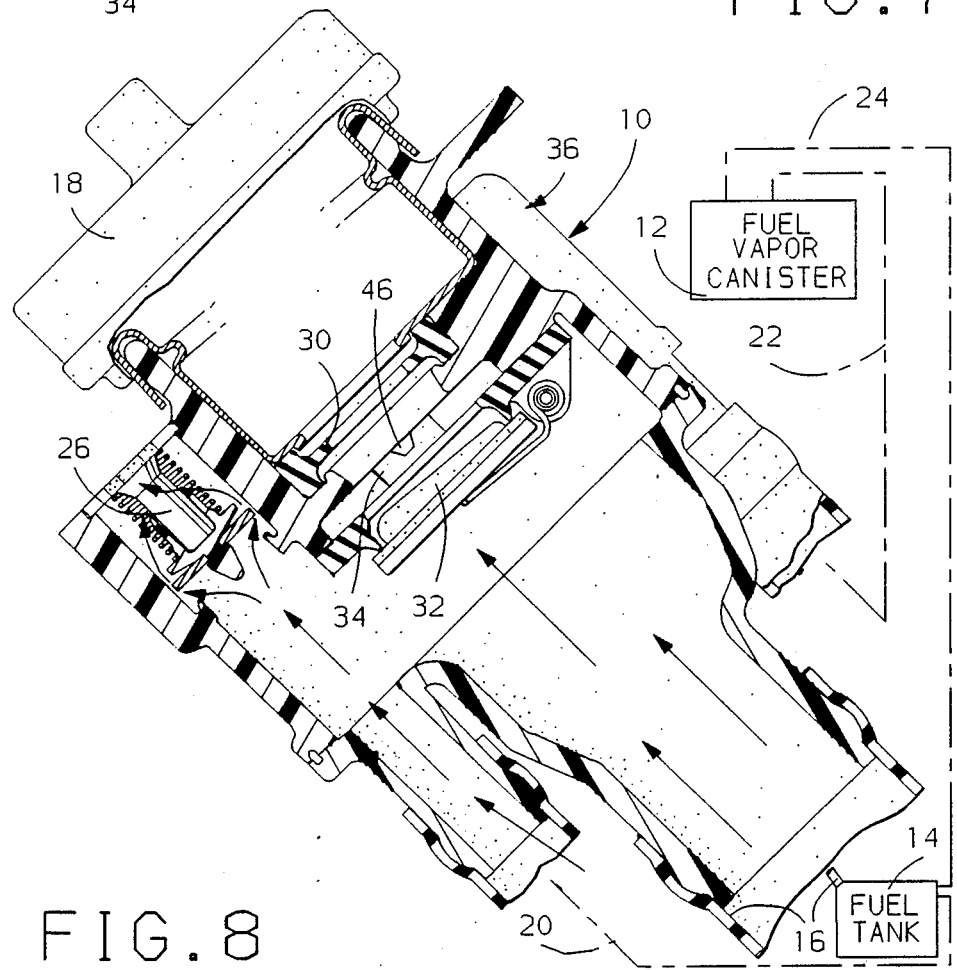

TANK VAPOR VENT VALVE ASSEMBLY WITH IMPROVED OVERFILL PROTECTION

This invention relates to vehicle fuel tank vapor recovery systems in general, and specifically to an improved overfill protection means for a tank vent valve assembly.

BACKGROUND OF THE INVENTION

Numerous designs have been proposed for recovering the fuel vapors displaced from a vehicle fuel tank as it is filled. Typically, a valve near the top of the tank filler pipe, known as a tank vent valve assembly or TVVA, selectively opens and closes a vapor line running from the top of the filler pipe to a vapor storage canister. The TVVA is open during the filling of the tank, to allow fuel fill vapors to go the the canister, but closed when the filler pipe is closed, so as to prevent liquid fuel from splashing up the filler pipe and into the vapor line. Many designs also provide further protection for the canister in the form of a buoyant float that rises to engage an open seal seat and block the vapor vent line in the event of liquid fuel overfill rising up to the end of the filler pipe at the end of the fuel fill.

A typical example of such an overfill protection float may be seen in U.S. Pat. No. 4,747,508 to sherwood, assigned to the assignee of the subject invention. Such a float should be very light in order to be sufficiently buoyant to shut off quickly in the event of overfill. However, the fuel fill vapors need a free exit path to the canister in order to prevent vapor pressure build up in the tank. Furthermore, the fuel fill vapors, which rush past the float and through the seal seat into the vapor vent line, may be traveling rapidly and have a significant volume, particularly in the case of a large fuel tank that is being rapidly filled. In a phenomenon known as "corking," the force of the rushing fuel vapors may physically lift the float up against the seat, thereby blocking free vapor exit to the canister during fill.

The float corking problem has been recognized in at least one instance. U.S. Pat. No. 4,714,172 to Morris shows a chamber interposed between the vapor vent line and the filler pipe that contains a round, buoyant float. The float chamber does not confine the float closely. Instead, the chamber has a spherical inner surface that is larger than the float, and the seal seat opening is located at the top of the sphere. The fuel fill vapors are apparently directed into the chamber so as to hit the float off center cause it to spin. The spinning float is supposed to continue to spin around the spherical inner surface of the chamber faster and faster, centrifugal force thereby keeping it away from the open seal seat. It would appear that the vehicle would have to be sitting in an attitude during fuel fill which assured that the seal seat was at top dead center of the float chamber, and that any shaking of the vehicle filler pipe by the filler nozzle might disturb the ball from its spinning orbit and into the seal seat.

SUMMARY OF THE INVENTION

The invention provides a different means for preventing the overfill protection float in a tank vent valve assembly from corking. Rather than being spherical, the lightweight float in the invention has an elongated axis with side surfaces that are parallel to its axis. In the preferred embodiment, the float is basically cylindrical, with a flat lower end and a seal attached to its upper end. The float rests closely within a sleeve-like interior wall of a float chamber so that it can slide up and down axially, like a piston in a cylinder. When the float is down, its upper end seal sits below an open seal seat, through which fuel fill vapors must pass in order to reach the vapor vent line to the canister. Before reaching the open seal seat, the fuel fill vapors must first past through the float chamber and around and over the outer surface of its sleeve-like interior wall.

Although the float is closely contained in the sleeve, there is still a thin envelope of clearance space between its outer surface and the inner surface of the sleeve. Furthermore, in the embodiment disclosed, internal ribs on the bottom of the sleeve keep the flat lower end of the float elevated slightly when the float is down. A pressure tube extends through the bottom of the sleeve, opening at its inner end below the lower end of the float, and at is outer end into the flow of fuel fill vapors through the chamber. Therefore, a negative pressure is created by the fuel fill vapors rushing past the outer end of the pressure tube that keeps the float pulled down into the sleeve, preventing the float from corking against the seat. However, if liquid fuel rises in the chamber due to overfill, it will flow over the top end of the sleeve and down around the float into the clearance space, buoying the float up against the seal seat to block the vapor vent line. The negative pressure will keep the float down regardless of the attitude of the vehicle, and will not be as susceptible to forces shaking the filler pipe during fill.

It is, therefore, a general object of the invention to provide an improved means for preventing the overfill protection float in a TVVA from corking.

It is another object of the invention to prevent corking by providing an elongated float that slidably fits with clearance within an interior sleeve of a float chamber, with a pressure tube opening at one end into the flow of fuel fill vapor and at the other end into the clearance space, so that the force of the vapor flow past the one end of the pressure tube will create a negative pressure to hold the float down, while liquid fuel overfill can enter the clearance space through the top of the sleeve and buoy the float up.

DESCRIPTION OF THE PREFERRED EMBODIMENT

These and other objects and features of the invention will appear from the following written description, and from the drawings, in which:

FIG. 6 is a view taken along the line 6—6 of FIG. 5;

FIG. 7 is a view taken along the line 7—7 of FIG. 5.

FIG. 8 is a view like FIG. 1, but showing the direction of pressurized vapors formed in the fuel tank as the vehicle sits.

Figure 1:
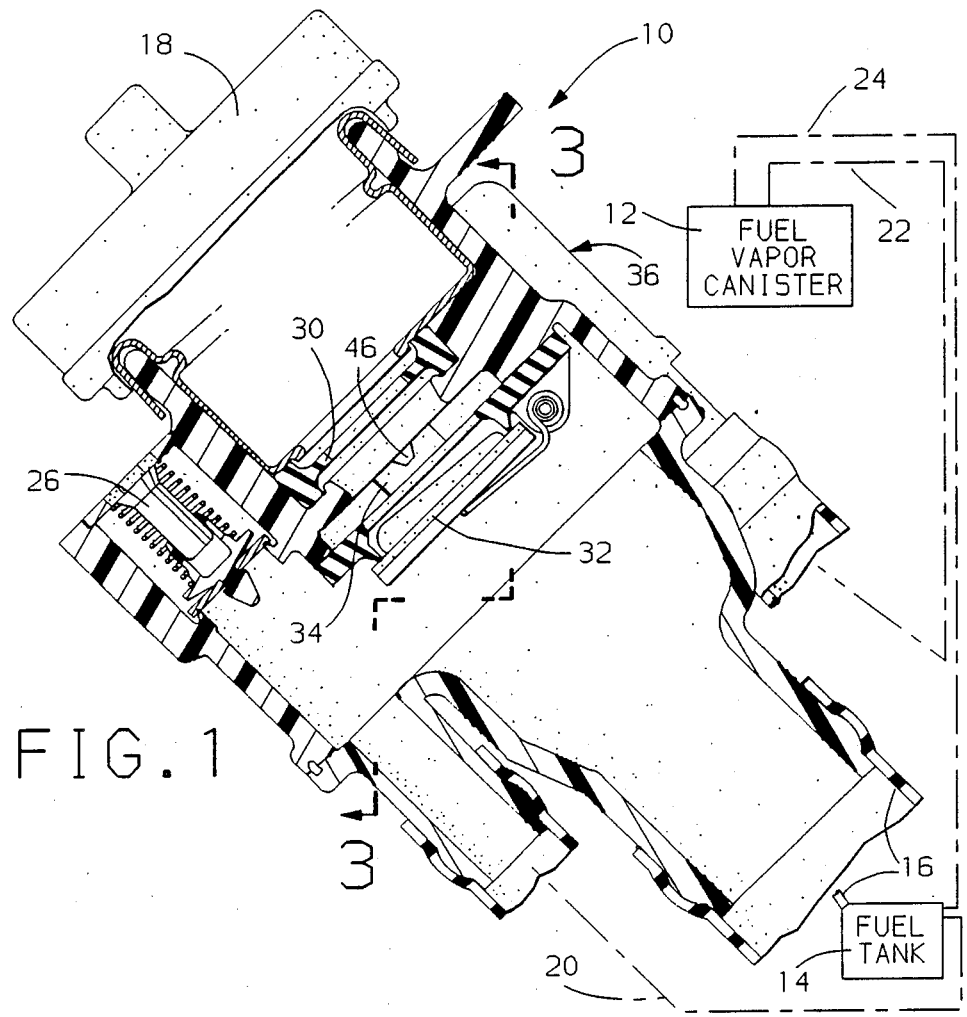
FIG. 1 is a cross sectional view of a preferred embodiment of a TVVA assembly incorporating the improvement of the invention, and showing a fuel tank and fuel vapor storage canister schematically.
Figure 5:
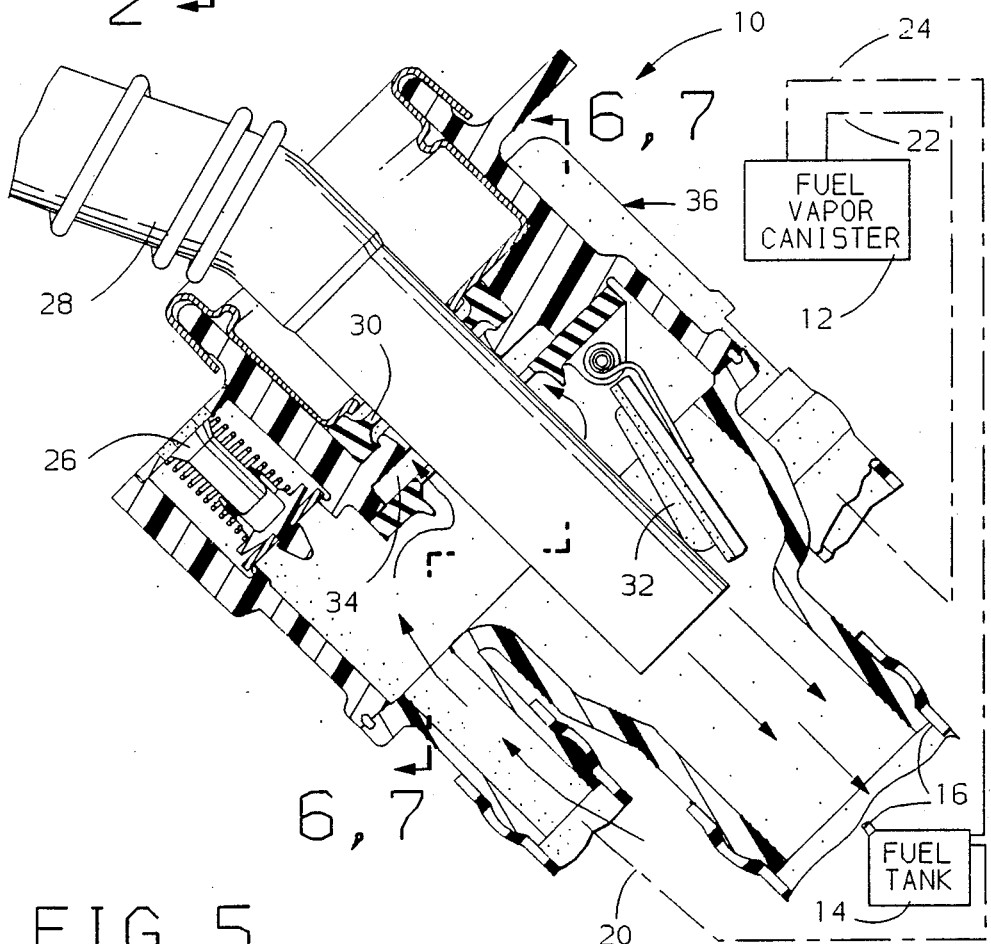
FIG. 5 is a view like FIG. 1, but showing a fuel nozzle in place during fill, and showing the downward flow of liquid fuel and the upward flow of displaced fuel vapors by arrows.

Referring first to FIGS. 1 and 5, a preferred embodiment of a tank vent valve assembly or TVVA, indicated generally at 10, includes several features, of which the improved overfill protection of invention is one. TVVA 10 is part of a total fuel vapor recovery system, which includes a fuel vapor storage canister 12 and a fuel tank 14. TVVA 10 includes a multi piece plastic housing, which serves as a foundation for several components, and which plugs as a unit into the top of a fuel tank filler pipe 16. A gas cap 18 threads into the top of TVVA 10 to close filler pipe 16. A fuel tank vent line 20 running from the top of tank 14 opens into one side of TVVA 10, while a vapor vent line 22 runs from the other side of TVVA 10 to canister 12. A diurnal loss vent line 24 runs from the top of tank 14 to canister 12 as well, which serves a purpose described below.

Referring next to FIGS. 1-4, tank 14 would be subject to a pressure rise when cap 18 was removed to fill tank 14 with a standard fill nozzle 28, if provision were not made for the free exit of the fuel vapors displaced from tank 14 by the entering liquid fuel. To that end, TVVA 10 has an annular nozzle seal 30 located coaxial to and below cap 18, above a sealing flapper door 32. Nozzle 28 fits tightly through seal 30, but passes through flapper door 32 with clearance. An internal passage 34 in TVVA 10 located between seal 30 and flapper door 32 runs to a float chamber on one side of TVVA 10, indicated generally at 36. Float chamber 36 has an internal wall in the form of an open topped sleeve 38, the outer surface of which is spaced from the inner surface of float chamber 36 so that displaced fuel fill vapors entering chamber 36 from internal passage 34 must flow around and over the outer surface of sleeve 38. The upper end of float chamber 36 forms an open seal seat 40 that is spaced from the open top of sleeve 38, and through which vapor must pass to reach the vapor vent line 22. The inner surface of sleeve 38 has axially extending side ribs 42 and bottom ribs 44, which serve a purpose described below. Finally, a pressure tube 46 extends through the bottom of sleeve 38, opening at its outer end into the area of chamber 36 where the flow of fuel fill vapors would pass, and opening at its inner end between the bottom ribs 44.

Figure 2:
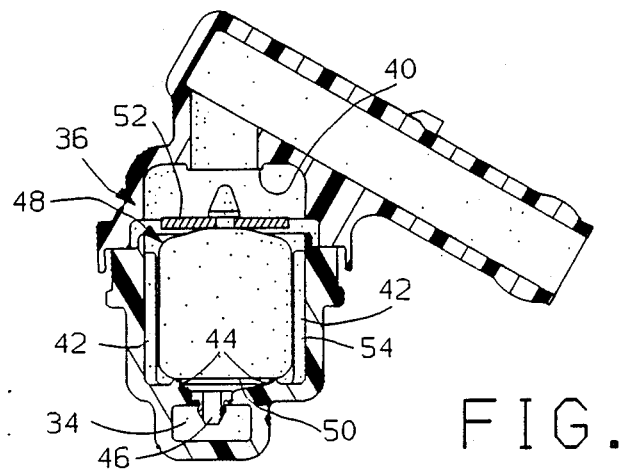
FIG. 2 is a sectional view taken along the line 2—2 of FIG. 3.
Figure 3:
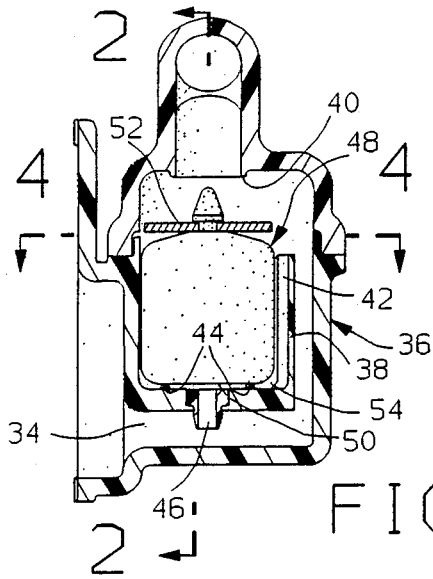
FIG. 3 is a sectional view taken along the line 3—3 of FIG. 1.
Figure 4:
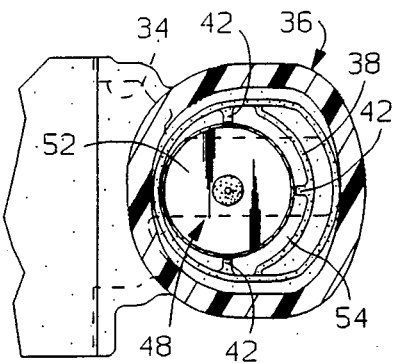
FIG. 4 is a sectional view taken along the line 4—4 of FIG. 3.

Referring next to FIGS. 2 through 4, a hollow cylindrical plastic float, designated generally at 48, has a flat lower end 50 and a flexible washer 52 fixed to its top end. In its down position, float 48 sits inside sleeve 38 with its top end free and extending above the top of sleeve 38, and with washer 52 sitting coaxially below the open seal seat 40. While float 48 is closely contained within sleeve 38, it is not tightly contained. The sleeve side ribs 42 hold the sides of float 48 away from the inside of sleeve 38, plus the float lower end 50 sits on the sleeve bottom ribs 44, thereby creating a thin envelope of clearance space 54 all around the outer surface of float 48. The space 54 is open at the top of sleeve 38, and the inner end of pressure tube 46 opens into it directly below float lower end 50, but is otherwise closed. Float 48 is also able to slide freely up and down about its axis within and guided by the sleeve side ribs 42, like a piston within a cylinder. Should float 48 move up as far as it can, washer 52 will engaged and block the seal seat 40 below which it normally sits. This relationship of structures allows the invention to operate as will be next described.

Referring next to FIGS. 5 through 7, as nozzle 28 is inserted through nozzle seal 30, it opens flapper door 32, and liquid fuel starts to flow into tank 14, as indicated by the down arrows in FIG. 5. Concurrently, fuel fill vapors are displaced from tank 14 and forced out vent line 20 to the top of filler pipe 16, as indicated by the up arrows in FIG. 5. From there, the only path out for the fuel fill vapors is to the side, through passage 34, and into float chamber 36, as indicated by the arrows in FIG. 6. The fill vapors may rush through with a significant velocity, as the space between the exterior of sleeve 38 and the interior of float chamber 36 through which they flow is somewhat constricted, and the liquid fuel can enter tank 14 rather rapidly from some nozzles. With float 48 in the down position shown, the fill vapors can freely exit float chamber 36 through the open seal seat 40. Two features contribute to keeping float 48 in the down position, preventing it from corking as prior designs can do. First, since float 48 is almost completely contained within the sleeve 38 interior to float chamber 36, less of it is exposed to the rushing vapors. Secondly, the vapors rushing past the outer end of pressure tube 46 create a negative pressure that is seen in the space 54, particularly at the float lower end 50, acting thereby to pull it down. However, should an overfill occur, and liquid fuel rise high enough in filler pipe 16 to reach the float chamber 36, it can pour down through the open top of sleeve 38 into the space 54, as well as up through the pressure tube 46, buoying float 48 to block the seal seat 40 and protect the vapor vent line 22 and canister 12.

Referring finally to FIG. 8, an additional feature of the preferred embodiment may be seen. Tank 14 is subject to positive pressure fluctuations when cap 18 is in place, due to the vaporization of liquid fuel therein, and due to rising temperature expansion of the liquid fuel and fuel vapor, indicated by the up arrows. The normal loss of this pressurized fuel vapor is generally referred to as the diurnal losses, and can pass to canister 12 through line 24. This helps to keep tank pressure down, but line 24 is generally restricted, so as to not encourage the formation of tank vapor. Therefore, another means is needed to relieve high tank pressure fluctuations. The poppet valve 26 can open to provide relief of this overpressure, which cannot escape through the vapor vent line 22, since it serves only to close the flapper door 32 more strongly. Thus, the need for an overpressure relief valve on gas cap 18 or on tank 14 is eliminated.

Variations of the preferred embodiment may be made. Sleeve 38 and float 48 could have another shape that lent itself to sliding up and down within the other, such as a rectangular prism, which also has an elongated axis. The cylindrical shape for float 48 and sleeve 38 is advantageous in that it gives a good up and down sliding action and is easy to manufacture and assemble into sleeve 38. Likewise, the flat bottom 50 for float 48 is not absolutely necessary, so long as the exterior sides of the float and the interior of the sleeve 38 create the thin envelope of clearance space 54 within which the negative pressure can act to keep the float seated. The flat float bottom surface 50 is particularly advantageous in that, in cooperation with the bottom ribs 44, it creates a thin disk of space which is well distanced from the open top of sleeve 38, and is thereby well suited to maintain the negative pressure to hold float 48 down. Therefore, it will be understood that it is not intended to limit the invention to just the preferred embodiment disclosed.

The embodiments of the invention in which an exclusive property or privilege is claimed are defined as follows:

1. In a vehicle fuel tank vapor recovery system of the type that has a vapor storage canister and a tank vapor vent valve assembly that routes the flow of fuel vapor displaced from the fuel tank during fuel fill to said canister, but which blocks liquid fuel from reaching said canister, the improvement comprising, a lightweight and buoyant float with an elongated axis having a seal at its upper end, a float chamber through which said flow of displaced tank vapor passes, said chamber having an interior wall within which said float is slidably received so as to move up and down along its axis, said interior wall having an inner surface that forms a thin envelope of space about said float while leaving said float upper end free, said interior wall also having an outer surface that is exposed to said flow of displaced tank vapor, a pressure tube extending through said float chamber interior wall so as to open at its inner end into said space envelope and at its outer end into said flow, and, a vapor vent line running from said canister to said float chamber and opening through said float chamber above said float seal, whereby, during fuel fill, as displaced tank vapor flows through said float chamber and past said pressure tube outer end, a negative pressure is created in said envelope of space that serves to keep said float down, and should liquid fuel reach said float chamber, it will flow into said envelope of space and around said float, buoying it freely up along its axis until its seal blocks said vapor vent line.

2. In a vehicle fuel tank vapor recovery system of the type that has a vapor storage canister and a tank vapor vent valve assembly that routes the flow of fuel vapor displaced from said fuel tank during fill to said canister, but which blocks liquid fuel from reaching said canister, the improvement comprising, a lightweight and buoyant cylindrical float having a seal at its upper end, a float chamber through which said flow of displaced tank vapor passes, said chamber having an internal, open topped sleeve within which said float is slidably received, said sleeve further having internal ribs contacting the sides of said float so as to form a thin envelope of space around said float, a pressure tube extending through said sleeve to open at its inner end into said envelope of space and at its outer end into said flow, and, a vapor vent line running from said canister to said float chamber and opening through said float chamber above said float seal, whereby, during fuel fill, as displaced tank vapor flows through said float chamber and past said pressure tube outer end, a negative pressure is created in said envelope of space that serves to keep said float down, and should liquid fuel reach said float chamber, it will flow into the open top of said sleeve and into said envelope of space, buoying said float up within said sleeve to block said vapor vent line.

3. In a vehicle fuel tank vapor recovery system of the type that has a vapor storage canister and a tank vapor vent valve assembly that routes the flow of fuel vapor displaced from said fuel tank during fill to said canister, but which blocks liquid fuel from reaching said canister, the improvement comprising, a float chamber through which said flow of displaced tank vapor passes, a sleeve internal to said float chamber having an outer surface over which said tank vapor passes, said sleeve having an open upper end and a closed bottom end, a lightweight and buoyant cylindrical float having a seal at its upper end and a substantially flat lower end, said float further being slidably received within said sleeve with its upper end above said sleeve upper end and with its lower end respective said sleeve bottom end with just sufficient clearance between said float and sleeve to create a thin envelope of space therebetween, a pressure tube extending perpendicularly through said sleeve bottom end to open at its inner end into said envelope of space below said float lower end and at its outer end into said flow of displaced tank vapor, which flow creates a negative pressure in said envelope of space and below said float lower end with maximum separation from said sleeve upper end, and, a vapor vent line running from said canister to said float chamber and opening through said float chamber above said float seal, whereby, during fuel fill, said negative pressure serves to hold said float down in said sleeve, and should liquid fuel reach said float chamber, it will flow into the open upper end of said sleeve to buoy said float up to block said vapor vent line.

\* \* \* \* \*